United States Patent [19]

Kushibiki et al.

[11] Patent Number: 5,739,948
[45] Date of Patent: Apr. 14, 1998

[54] REFRACTIVE INDEX MODULATION DEVICE AND METHOD OF REFRACTIVE INDEX MODULATION

[75] Inventors: Nobuo Kushibiki, Kanagawa; Fumito Nishida, Tokyo; Takuya Ogawa, Kanagawa, all of Japan; Toshio Suzuki, Midland, Mich.

[73] Assignee: Dow Corning Asia, Ltd., Tokyo, Japan

[21] Appl. No.: 730,721

[22] Filed: Oct. 8, 1996

[30] Foreign Application Priority Data

Oct. 12, 1995 [JP] Japan ................................ 7-263914
Jan. 31, 1996 [JP] Japan ................................ 8-015174

[51] Int. Cl.$^6$ .......................................................... G02F 1/00
[52] U.S. Cl. ........................... 359/321; 359/275; 525/478; 528/15
[58] Field of Search ............................. 359/321, 257, 359/258, 275, 350, 267, 361; 525/478; 528/15, 31, 32

[56] References Cited

U.S. PATENT DOCUMENTS

| 5,239,406 | 8/1993 | Lynam | 359/275 |
| 5,355,245 | 10/1994 | Lynam | 359/267 |

FOREIGN PATENT DOCUMENTS

| 642052A1 | 3/1995 | European Pat. Off. . |
| 669362A2 | 8/1995 | European Pat. Off. . |
| 672725A2 | 9/1995 | European Pat. Off. . |
| 682771A1 | 11/1995 | European Pat. Off. . |
| 06/83100 | 4/1994 | Japan . |
| WO89/04532 | 5/1989 | WIPO . |

OTHER PUBLICATIONS

Electronics Letters, vol. 24, No. 8, Apr. 14, 1988.
Applied Optics, vol. 25, No. 21, Nov. 1, 1986.
Patent Abstracts of Japan, vol. 017, No. 387, Jul. 20, 1993.

*Primary Examiner*—Loha Ben
*Attorney, Agent, or Firm*—James E. Bittell

[57] ABSTRACT

A refractive index modulation element made of a refractive index modulation material. The refractive index can be thermally modulated. The refractive index modulation material can be a silicone resin represented by the following formula $R_nSiO_{(4-n)/2}$, where the average value of n is 0.5 to 3 and where K is an aliphatic or aromatic group with 1 to 18 carbon atoms or other functional group. The silicone resin has a spectral transmission factor that on average is higher than 80%, within the wavelength range of 350 nm to 1,600 nm, and a refractive index temperature dependence of $-0.001/°C$. to $-0.00005/°C$.

13 Claims, No Drawings

REFRACTIVE INDEX MODULATION DEVICE AND METHOD OF REFRACTIVE INDEX MODULATION

BACKGROUND OF INVENTION

The present invention relates to a light modulation device that performs optical control by modulating a refractive index of a polysiloxane material through the application of heat, and a method of making the light modulation device.

Various attempts have been made to modulate the light and control its propagation by applying to it a certain excitation from an external source. Thus, known in the art is a system that is used for creating a phenomenon of the so-called Pockels effect or Kerr effect according to which an application of an electric field from an external source to a substance known as an optoelectrical crystal, such as lithium niobate or PLZT (lead zirconate titanate oxide doped with lanthium), changes the refractive index of this substance. In another known system, the application of sonic waves to crystals of tellurium dioxide or tin molybdate, from an outer source generates strains and causes a photoelasticity effect. In another known system, a photoelasticity effect generates, with the application of sonic waves from an outer source, strains in crystals of tellurium dioxide, or tin molubdate.

However, light modulation elements which are based on the use of the aforementioned phenomenon must incorporate crystals which are a problem from the point of view of materials. Furthermore, studies are continued on a newly proposed systems based on a phenomenon of optical non-linearity obtained with the use of light control means. Although these systems solve the problems associated with the materials, they are not ready yet for practical application.

Light modulation systems that utilize materials with a thermally variable refractive index are also known. For example, studies have been conducted with regard to plane waveguide devices based on the use of inorganic materials such as titanium-doped lithium niobate, ion-exchange glass, or organic polymers. Functions of the aforementioned devices have been proven (*J. Lightwave Technology*, vol. 17, pp. 449–453, 1989). Furthermore, it has been reported that polycarbonate, polyimide, polyacrylate, and other similar thermoplastic resins can be used as materials suitable for modulation of their thermally excited refractive indices (European Application No.642,052). However, a problem which occurs during the use of organic resins for optical applications is associated with the fact that many organic resins are hygroscopic, and this creates optically uncontrollable variation in the refractive indexes of these resins.

When the materials for light modulation elements are to be used as means for thermal modulation of a refractive index, it is required that they provide significant variation in the refractive index, possess excellent stability with regard to the environment, and be easily implemented in the process. Furthermore, many resins that have been used for optical application are thermoplastic resins, and since thermoplastic resins are soluble in solvents, it is required to avoid applications that involve the use of solvents. In the cases where thermoplastic resins are used, it is required that the applied temperature be below the temperature of thermal deformation of the resin, and this fact alone significantly limits the range of modulation of the refractive index.

Japanese Laid-Open Patent Application #61-240207, discloses that organopolysiloxane resins may function as passive materials and are used merely as light-transmissive layers. However, it has been unknown that they may constitute an active material of the type that may cause modulation of the refractive index under the effect of heat as a source of external excitation.

SUMMARY OF INVENTION

It is an object of the present invention to provide a light modulation device which is made of a material that is characterized by a wider usable temperature range and excellent workability, and a method of making such a light modulation device. It is a further object of the present invention to provide a refractive-index modulation element made of a specific polysiloxane as the material suitable for use as a refractive index modulation material.

The present invention provides a refractive index modulation element made of a polysiloxane material, characterized by a refractive index that is modulated with heat, such that, within the wavelength range of 350 ran to 1,600 nm, the polysiloxane has a spectral transmission factor which on average is higher than 80% and does not have a specific light-absorption band; and the polysiloxane has a temperature dependence of a refractive index within the range of $-0.001/°$ C. to $-0.00005/°$ C.

In the broadest embodiment, the polysiloxane material is a silicone resin with an average structure represened by $R_nSiO_{(4-n)/2}$, where n is a number from 0.5 to 3, and R is selected from a group consisting of a hydrogen atom, a hydroxyl group, an epoxy group, an amine-containing function group, a saturated or non-saturated aliphatic hydrocarbon group having 1 to 18 carbon atoms, an aromatic hydrocarbon group having 6 to 18 carbon atoms, or a halogenated hydrocarbon group having 1 to 18 carbon atoms, said silicone resin having a viscosity below 20,000 cP between its melting point and its decomposition point. In a preferred embodiment, the polysiloxane is a silicone resin with an average structure represented by the formula $R_nSiO_{(4-n)/2}$, where n is a number greater than 0.5, but smaller than 3, and where R is an aliphatic or aromatic group with 1 to 18 carbon atoms.

The present invention also provides a method of making an refractive index modulation device that includes, applying a polysiloxane material on a light-propagation medium, hardening the applied resin, and then placing a heat application means onto the cured body of said silicone resin.

DESCRIPTION OF INVENTION

The present invention provides a refractive index modulation element which is made from a material having a refractive index that changes as the temperature of the material changes. The refractive index modulation element is formed from a polysiloxane material which satisfies the following conditions:

(1) within the wavelength range of 350 nm to 1,600 nm, it has a spectral transmission factor which on average is higher than 80% and does not have a specific light-absorption band;

(2) it has a refractive index with a temperature dependence of $-0.001/°$ C. to $-0.00005/°$ C.

The invention is efficient in that it provides an element with a wider range of modulation of a refractive index than the elements produced from conventional thermoplastic resins. Such element can be used in the manufacture of directional combined optical switches, branched interference-type optical switches, and thermally-modulated optical switches. These switches are produced by preliminarily matching the refractive index of the resin with the light propagating medium and modulating the index by heating, or by using different refractive indexes and modulating the refractive index by heating so as to match the refractive index with that of the light propagating medium.

It is required that the material used in the refractive index modulation element as means for thermally modulating refractive index allow a significant variation in the refractive index, and possess excellent stability with regard to the environment. For example it should maintain its refractive index almost unchanged when the material absorbs moisture from the surrounding air, and be a material that readily allows modulation of the refractive indexes.

When a refractive index modulation element is manufactured from a conventional organic resin and the manufacturing process includes a subsequent vapor deposition which is conducted under high-temperature conditions, problems occur in connection with insufficient heat-resistive properties of the organic resin. It is difficult to perform such vapor deposition on many types of resin. In some cases the process may be accompanied by cooling. When polysiloxane is used, many of the above problems may be eliminated which is an advantages of the polysiloxane over other organic resins.

The refractive-index modulation element of the present invention changes its light-refractive index under the effect of excitation applied to it from the outside and thus has a function of controlling propagation of light. The refractive index modulation device may be solely a element made of a refractive index modulation material that causes modulation of the refractive index under the effect of heat, or it may consist of an element made of the refractive index modulation material and a light propagation medium which is in contact with the element.

The refractive index modulation material of the present invention has a spectral transmission factor that on average is higher than 80% in the wavelength range from 350 nm to 1600 nm. Furthermore, it does not have a specific light-absorption band. This is an advantageous property since wavelengths of many lasers used in the field of optical communication or the like are within the aforementioned range. In general, as compared to other organic resins the silicone resin has a lower hygroscopicity, and therefore it is to a lesser degree subject to optically noncontrollable variations in the refractive index.

In a preferred embodiment, said refractive index modulation material can be a silicone resin with an average structure represented by the formula $R_nSiO_{(4-n)/2}$ where n has an average value greater than 0.5, but smaller than 3, and where R is an aliphatic or aromatic group with 1 to 18 carbon atoms. More specifically, a polysiloxane resin suitable for the invention consists mainly of traits represented by the general formula $R_mSiO_{(4-m)/2}$ where m is an integer from 0 to 3 and R is an aliphatic or aromatic group with 1 to 18 carbon atoms.

In the formula, R may be represented by a saturated hydrocarbon group with 1 to 18 carbon atoms irrespective of whether the structure of the group is straight or branched. Examples of such groups are the following: methyl, ethyl, propyl, butyl, amyl, hexyl, 2-ethylhexyl, dodecyl, octadecyl; alkenyl groups such as vinyl and allyl; aryl groups such as phenyl, tolyl; trifluoropropyl, heptafluoropentyl, nanofluorohexyl or similar fluorohydrocarbon groups; and saturated halogen substituted hydrocarbon groups such as chloromethyl, chloroethyl; which, irrespective of whether they are branched or straight, should have 1 to 18 carbon atoms.

It is possible to utilize resins of so-called polysiloxane group which are obtained by subjecting a silicone compound with 2 hydrolyzable groups in its molecule to hydrolysis and condensing. Resins which are synthesized in the same manner from compounds having 1, 3, or 4 hydrolyzable groups also may be suitable for the present invention. They are known in the silicone industry as MT resins or MQ resins. Resins which are known as T resins or polysilsesquioxane can be prepared from compounds having 3 hydrolyzable groups. There is also a copolymer of a silicone compound having 4 hydrolyzable groups and a silicone compound having 3 hydrolyzable groups, with 4-n in the aforementioned general formula greater than 3.

The polysiloxane selected will determine the refractive index characteristics of the light-propagating medium. The refractive index of polysiloxane cannot be changed significantly if the organic groups substituted on silicon are identical. However, the refractive index of polysiloxane can be changed by changing the type of organic groups. For example, if R in the polysiloxane is methyl or phenyl, then in poly(dimethyl-diphenyl) siloxane the refractive index $n_d$ will be 10. within the range of 1.409 to 1.52, in polymethylphenyl siloxane it will be equal to 1.550, and in poly (dimethyl-methylphenyl-diphenyl) siloxane it will be between 1.409 and 1.550. Thus, when it is necessary to increase the refractive index, it is better to use aromatic groups, and when it is necessary to decrease the refractive index, it is better to use aliphatic groups. By controlling the concentration of both groups, it becomes possible to adjust the basic index of refraction. Furthermore, chlorine and bromine may be substituted on aromatic groups, and when it is necessary to reduce the index of refraction, it can be achieved by utilizing copolymers of compounds containing metal such as boron or by using an aliphatic group that substitutes fluorine. It is understood that the selection should be done with reference to the speech transmission factor or a light-absorption band, which will be described later.

While polysiloxanes are available that are suitable for the present invention without cross-linking, it is recommended to use polysiloxane in combination with cross-linking and hardening substances. Cross-linking can be carried out either by introducing partially different hydrolyzable groups during polymerization and then causing their condensation and cross-linking upon completion of the polymerization, or by adding a cross-linking agent at a cross-linking stage and thus completing the cross-linking operation. Provided that there are no special limitations, such a cross-linking agent may be represented by a silicone compound having several hydrolyzable groups in one molecule. The following are examples of hydrolyzable groups: hydroxyl groups, methoxy, ethoxy, propoxy, and butoxy groups some of which may be substituted by methyl, ethyl, propyl, butyl, amyl, hexyl, phenyl, or tolyl groups. The use of a hardening catalyst is not an indispensable feature, but any catalyst which is used for hardening a conventional silicone resin may be used. Such catalysts are selected from butyltin adipates or similar salts of alkyltin organic acids, with reference to the time and temperature required for hardening.

Addition-type, cross-linking reactions, which occur without the formation of volatile low-molecular-weight compounds, are reactions between -SiH groups and vinyl groups, reactions between hydroxyl groups and isocyanates, reactions between epoxy groups and amines or acid arehydrides, reactions of vinyl groups initiated by peroxides or reactions caused by light. One of the above combinations of functional groups may be copolymerized in the silicone resin during polymerization and other combinations may be included in the cross-linking agent.

The cross-linking reaction should not be necessarily a reaction between identical polymers having respective substituents, and cross-linking may be performed through the use of bifunctional or higher than bi- polyfunctional low molecular-weight compounds. For example, cross-linking of a resin having a carbinol-type residual radical can be performed by using xylidene diisocyanate or cyclohexane diisocyanate. In particular, when it is required to perform hardening at a temperature close to room temperature, it is recommended to combine respective resins with SiH and vinyl groups or to combine a resin with a cross-linking agent, and then to carry out hydrosililation with the use of a platinum catalyst. There are no special limitations with regard to a platinum catalyst suitable for the process but the use of platinum acid salts is preferable.

Only one type of a silicone resin may be used, or two or more than two types of silicone resins may be used in combination. Depending on the method of hardening, the resin may be combined with a hardening catalyst, a cross-linking agent, a peroxide, and sensitizer. It is also understood that the resin can be diluted in a solvent. The silicone resin of the invention can be selected from the following items (1), (2), (3), (4), or (5):

(1) a silicone resin which is a mixture of two types of mutually reactable resins, both represented by the formula $R_n SiO_{(4-n)/2}$ if necessary, with the use of a hardening catalyst;

(2) a silicone resin which is a mixture of mutually reactable components such as a hardenable silicone resin represented by the formula (1) $R_n SiO_{(4-n)/2}$ and a cross-linking agent, if necessary, with the use of a hardening catalyst;

(3) a silicone resin that for the purpose of hardening contains a peroxide;

(4) a silicone resin that contains a sensitizer;

(5) one type of a silicone resin.

It is preferable that in the formula, R be one of the following: a hydrogen atom, a hydroxyl group, an epoxy group, an amine-containing functional group, an aliphatic hydrocarbon group having 1 to 18 carbon atoms, an aromatic hydrocarbon group, or a halogenated hydrocarbon group. These groups may be saturated, unsaturated, linear or branched.

If the above conditions are satisfied in selecting an organic group represented by R, the following examples may be considered as preferable, but not limitative. More specifically, the aliphatic saturated hydrocarbon groups may be represented by methyl groups, ethyl groups, propyl groups, butyl groups, amyl groups, hexyl groups, 2-ethylhexyl groups, dodecyl groups, octadecyl groups, etc. Examples of the aliphatic unsaturated hydrocarbon groups are alkenyl groups represented by allyl groups, vinyl groups, etc. Examples of aromatic hydrocarbon groups are phenyl groups, aryl groups represented by tolyl groups, etc. Examples of halogenated hydrocarbon groups are C1–C 18 linear or branched halogen substituents of saturated hydrocarbon groups represented by chloroethyl groups, chloromethyl groups, nanofluorohexyl groups, heptafluoropentyl groups, trifluoropropyl groups, etc.

The degree of refractive index modulation under the effect of heat also depends on the structure of the resin. If it is required that the degree of modulation be high, it is necessary to select a resin which has its main component in the form of a polysiloxane-type resin of the formula $R_n SiO_{(4-n)/2}$ where n=2. If, on the other hand, the degree of modulation should be small, it is possible to select a resin with the main component in the form of a copolymer composed of between three hydrolyzable groups and four hydrolyzable groups with n<1. It is possible, due to these variations in the structure, to adjust the temperature dependence of the refractive index to any required value within the range of 0.001 to 0.00005. Since temperature modulation of the refractive index is in a linear relationship with thermal expansion, as it is known from polymer chemistry, the refractive index can be adjusted either by increasing a degree of cross-linking or by reducing it.

The resin with a refractive index modulation adjusted as described above is mixed with a cross-linking agent, a hardening catalyst, and, if necessary, with a hardening delay agent, and the mixture is applied onto a light propagation medium by a known method which is selected in accordance with the purpose of the product, such as: spin coating, casting, dipping. An example of a cross-linking agent suitable for the purposes of the present invention is a silicone compound having in its molecule several hydroxyl groups or hydrolyzable groups. It is possible to introduce during polymerization partially different hydrolyzable groups and, upon completion of the polymerization, to cause their condensing and cross-linking. The following are examples of hydrolyzable groups: methoxy, ethoxy, propoxy, and butoxy groups some of which may be substituted by methyl, ethyl, propyl, butyl, amyl, hexyl, phenyl, or tolyl groups. The use of a hardening catalyst is not an indispensable feature, but a catalyst which is used for hardening a conventional silicone resin may be used. Such a catalyst is selected from dibutyltin adipates or similar salts of alkyl tin organic acids, with reference to the time and temperature required for hardening.

Examples of addition-type cross-linking reactions, which occur without the formation of volatile low-molecular-weight compounds include reactions of —SiH groups and vinyl groups, hydroxyl groups and isocyanates, epoxy groups and amines and acid arthydrides, etc., peroxides with vinyl groups or reactions caused by light. One of the above combinations of functional groups may be copolymerized in the silicone resin to a predetermined amount during polymerization, and other group may be included in the cross-linking agent. When it is required to perform hardening at a temperature close to room temperature, it is recommended to combine SiH and vinyl groups with respective resins or to combine a resin that contains a cross-linkable group with a cross-linking agent, and then to carry out hydrosililation with the use of a platinum catalyst. There are no special limitations with regard to a platinum catalyst suitable for the process but the use of platinum acid salts is preferable. A method suitable for the manufacture of silicone resins with the use of the present invention is described for the first time as a method of synthesis of siloxane polymers, for example in *Silicon-Based Polymer Science by Ed, John M. Ziegler & F. W. Gordon Fearon,* ACS series 224, The American Chemical Society, 1990, p. 71.

When it is stated that the polysiloxane resin of the invention does not contain a specific light absorption band, it means that the polysiloxane resin does not contain certain groups having a specific absorption band in a visible-light range. When it is stated that there are no hydroxyl groups bonded to a silicon atom, this means the absence of an absorption band for such bonds in the vicinity of 1550 run.

A refractive index modulation element of the present invention may consist merely of a single refractive index modulation element. An example of such an application is an optical fiber. The light modulation element of the present invention may also be manufactured as a heat-modulated optical switch, such as a branch-interference-type optical switch formed by means of Mach-Zehnder interference systems and a directivity combined optical switch. The heat-modulated optical switches are produced either by preliminary matching the refractive index with the light-propagating medium and then heating and modulating the refractive index, or by modulating a different refractive index through the application of heat and thus matching it with the refractive index of the light-propagating medium.

The invention is effective in that it facilitates the production of heat-modulation-type optical modulation elements which operate in a wide range of temperatures, can be adjusted in a wide range of temperatures, and can be produced without the loss of optical characteristics.

A refractive index modulation device of the present invention may also comprise an element made of a refractive index modulation material and a light-propagation medium which is placed in contact with the element. An example suitable for this case is an optical switch.

The light-propagation medium used in the invention may be represented by inorganic materials such as various types of glass, or by organic materials such as light-propagating polymers. These materials are given only as examples which do not limit the scope of application of the invention, so that any other materials that possesses light-propagating properties and is suitable for various optical and electrical applications can be used.

It is advantageous for fabrication of the element of the invention that the viscosity of the silicone resin be lower than 20,000 cP. The viscosity may be reduced by utilizing resins with various functional groups required for cross-linking. However, an appropriate viscosity can also be achieved by heating the resin to a temperature above the melting point and thus liquifying the resin. It is recommended that the aforementioned temperature be below 250° C.

In accordance with the invention, the viscosity of the resin may be further reduced by dissolving the aforementioned resin in a solvent or by combining it with the solvent. The aforementioned resin is applied onto the light-propagating medium by a known method and is cured. If the aforementioned viscosity is higher than 20,000 cP, it is undesirable because it may cause a density difference formed by a nonuniform flow of the resin on the surface of a transparent medium. This, in ram, may cause birefringence. Basically, the viscosity may be adjusted by adjusting the molecular weight of a silicone resin used. A distinguishing feature of cross-linking of silicone resin consists in that, as opposed to a 10%-volumetric shrinking observed in the process of cross-linking of conventional organic polymer systems, for silicone resins the coefficient of shrinking is lower than 10%. This is one of the very important features for the formation of fine patterns as well as for filling fine gaps between the transparent medium and heat-application means. After the resin of the invention hardens, the manufacture of heat-application means is accomplished by properly bringing the heat-application means into contact, and by performing vapor deposition from the gaseous phase after hardening.

The present invention also covers appropriate processes for application and hardening to said silicone resin on said light-propagation medium. Specific examples include a method in which a silicone resin or a product of dilution of a resin in a solvent is applied onto a light propagating medium, a method in which a light propagating medium is dipped into them, a method in which they, are sprayed onto the light propagating medium, etc.

The construction of a refractive index modulation element which consists of a light-propagation medium brought in contact with a layer of a may be accomplished in the form of the following embodiments:

a) A construction in which refractive indexes of the refractive index modulation material and the light-propagation medium are preliminarily matched. In this case, the refractive index of the refractive index modulation material can be reduced by heating to a level below that of the refractive index in the light-propagation medium.

b) A construction in which there is a difference between the refractive indexes of the refractive index modulation material and the light propagation medium. An example of this case is a construction of a refractive index modulation element which is made of a light-propagation medium and a refractive index modulation material having a refractive index greater than that of the first-mentioned medium. Both refractive indexes can be matched by modulating the refractive index to a lower value by heating.

In an actual construction a refractive index modulation element may be combined with means for application of heat to this element. Although there are no special limitations, the aforementioned heat application means may be a heater that generates heat electrically. Heat application means used in printers of thermal copiers are also applicable for the same purpose.

A device which consists of a refractive index modulation element combined with heat application means may be manufactured by various methods. For example, the polysiloxane may be brought in contact with a heat-application means after the polysiloxane used in the refractive index modulation element is cured. Alternatively, the polysiloxane may be brought in contact with the heat application means during hardening of the polysiloxane used in the refractive index modulation element. As another alternative, a heat application means may be of different types and may be attached to the refractive index modulation element by vapor deposition, or by deposition from a gaseous phase.

A specific example of a heat-application means is formed by making a heating element as a layer of a metal having a thickness greater 200 Å, preferably greater than 1 min. This layer is applied, e.g., by vapor deposition from a gaseous phase. The heat-application means is then accomplished by connecting the heating element (electrode) to an electric circuit. Apart from the method mentioned above, metal for the heating element may be deposited by nonelectrolytic plating, etc., from a liquid phase. Furthermore, a metal plate which would form a heating element may be merely attached to the optical modulation element, and the formation of a heat-application means accomplished by connecting the heating element (electrode) to an electric circuit. In such case, the silicone resin is placed onto a light-propagating medium, said resin may have a refractive index that coincides with that of the medium or have a predetermined difference with respect to the refractive index of the medium. The refractive index of the silicone resin may be preliminarily selected the same as that of the light-propagating medium and then made lower than that of the light-propagating medium by application of heat, or the refractive indexes of both the medium and the resin may be matched by heating the resin with a high refractive index and thus modulating the high refractive indexes to a lower value. This is a feature that distinguishes silicone resins of the present invention from conventional organic resins. Silicone resins can be adapted to properties required to complement the other components. The thermal stability of the silicone resin itself may vary within the range of 250° C. to 450° C., the refractive index can be modulated at most within the range of the second digit of the decimal point, for example between 0.02 and 0.04. Therefore, the difference between both refractive indexes must be set within the aforementioned range. It goes without saying that for an organic-type light-propagating medium, the upper limit of the refractive index is selected with reference to heat-resistive properties of the light-propagating medium.

It is recommended that temperatures below 250° C. be applied to the element to modulate the refractive index. As far as the temperature range is concerned, modulation of the refractive index is possible within the range of −70° to 250° C. This temperature range was selected based on the thermal dependence of the refractive index and the thermal stability of polysiloxane.

EXAMPLE 1

A silicone resin containing vinyl groups was synthesized as follows. A 300-ml round-bottom flask was filled with 1,3-divinyl-1,1,3,3-tetramethyl disiloxane (14.9 g, 0.08 mole), distilled water (10.1 g, 0.56 mole), hydrochloric acid (3.5 g, 0.096 mole), and ethanol.(6.5 g, 0.14 mole), and the contents were stirred at 50° C. Phenyl triethoxy silane (9.6 g, 0.04 mole), methyl trimethoxy silane (38.1 g, 0.28 mole), and ethanol (6.5 g, 0.14 mole) were loaded into a dripping fimnel and added by dripping to the mixed solution which was maintained in the round-bottom flask under stirring conditions. The mixture was maintained under refluxing conditions for 2 hours. After completion of refluxing and cooling to room temperature, hexane was added, the organic layer was washed until neutral. Anhydrous magnesium sulfate was added, water was removed, and after filtration of the salt, an organic solvent was removed.

A second silicone resin, containing SiH was synthesized as follows. A 500-ml round-bottom flask was filled with 1,1,3,3-tetramethyl disiloxane (50.4 g, 0.375 mole), distilled water (48 g, 3 mole), hydrochloric acid (24 g, 0.66 mole), and methanol (15 g, 0.47 mole), and the contents were stirred at a temperature below 10° C. Tetramethoxy silane (114.2 g, 0.75 mole) was added by dripping at a temperature below 10° C. to the mixed solution, and stirring was carried out for 2 hours at room temperature. The solution was then neutralized and the salt and the solvent were removed in the same manner as above.

The SiH-containing silicone resin and the vinyl-group-containing silicone resin synthesized as described above were mixed, and viscosity of the mixture at room temperature was measured as 4,500 cP by means of a B-type rotary viscosimeter. The mixture was combined with a platinum catalyst, and the components were mixed to a uniform condition. The mixture was cured to a solid state by heating it for 2 hours at 80° C. The analysis (spectrophotometer Mod. U-3210, Hitachi Ltd.) showed that the solid body of the silicone resin had a transmission factor exceeding 85% over the entire wavelength range from 350 nm to 1600 nm. At 20° C., $n_d$ which was measured with respect to d-line 587.6 nm at 20° C. by means of a precision refractometer (Mod. KPR-200, the product of Kartmyu Optical Industries) was equal to 1.4319, and the thermal characteristic of the refractive index of the sample was equal to $-3.2 \times 10^{-4}$/° C.

A waveguide of a silica glass ($n_d$=1.4586) was made on a silicon wafer, and a layer of the aforementioned silicone resin was laminated onto it in the form of a thin film. The silicon wafer was heated to 150° C., and the intensity of light propagated through the waveguide, emitted from the silicone resin and passed through an optical fiber was measured by means of a spectrophotometer. The measurements showed a 25% reduction as compared to the intensity of the light emerged prior to the heating.

EXAMPLE 2

A silicone resin which contains vinyl groups was synthesized in the same manner as in Example 1, with the exception that phenyltrichlorosilane (16.8 g, 0.7 mole) was used instead of the phenyl triethoxy silane.

A SiH-containing cross-ling agent was synthesized by the same method as the SiH-containing silicone resin of Example 1, with the exception that phenyl trimethoxy silane (29.74 g, 0.15 mole) and tetramethyl disiloxane (60.45 g, 0.45 mole) were used.

The silicone resin containing vinyl groups and the Si—H— containing cross-linking agent were mixed with a platinum catalyst, and the mixture was cured by heating for 2 hours at 120° C. Optical characteristics of the solid body of silicone resin were measured in the same manner as in Example 1 and showed that within the entire wavelength range of 350 nm to 1600 am, the resin had transmission factor exceeding 85%. At 25° C., $n_d$ was equal to 1.5160, and the thermal characteristic of the refractive index of the sample was equal to $-3.5 \times 10^{-4}$/° C. A waveguide was formed in the same manner as in Example 1, with the exception that a BK-7 glass ($n_d$=1.5163) was used instead of the silica glass. After heating to about 100° C., the intensity of light emitted from the waveguide was increased to about three times the intensity of light prior to heating.

What is claimed is:

1. A refractive index modulation device comprising a refractive index modulation element formed from a polysiloxane material having a spectral transmission factor on average higher than 80% within the range of 350 nm to 1,600 nm, and a refractive index temperature dependence of −0.001/° C. to −0.00005/° C.

2. The refractive index modulation device of claim 1 wherein said polysiloxane material consists essentially of a silicone resin with an average structure represented by $R_nSiO_{(4-n)/2}$ where n is a number from 0.5 to 3, and R is selected from a group consisting of a hydrogen atom, a hydroxyl group, an epoxy group, an amine-containing function group, a saturated or non-saturated aliphatic hydrocarbon group having 1 to 18 carbon atoms, an aromatic hydrocarbon group having 6 to 18 carbon atoms, or a halogenated hydrocarbon group having 1 to 18 carbon atoms, said silicone resin having a viscosity below 20,000 cP at a temperature between its melting point and 250° C.

3. The refractive index modulation device of claim 2, wherein [said polysiloxane material consists essentially of a silicone resin with an average structure represented by the formula $R_nSiO_{(4-n)/2}$ where] n is a number greater than 0.5, but smaller than 3, and where R is an aliphatic or aromatic group with 1 to 18 carbon atoms.

4. A method of modulating the refractive index of the refractive index modulation element of claim 3, comprising modulating the temperature of the refractive index modulation element within a temperature range of −70° to 250° C.

5. The refractive index modulation device of claim 2 wherein the silicone resin is cured by an addition reaction between —SiH groups and vinyl groups, catalyzed with a platinum catalyst.

6. A method of modulating the refractive index of the refractive index modulation element of claim 5, comprising modulating the temperature of the refractive index modulation element within a temperature range of −70° to 250° C.

7. The refractive index modulation device of claim 1, wherein said polysiloxane material is formed from a mixture of:

a first silicone resin with an average structure represented by the formula $R_nSiO_{(4-n)/2}$, where n is a number greater than 0.5, but smaller than 3, where R is an aliphatic or aromatic group with 1 to 18 carbon atoms and where an effective amount for curing of the R groups are alkenyl groups;

a second silicone resin with an average structure represented by the formula $R'_n SiO_{(4-n)/2}$, where n is a number greater than 0.5, but smaller than 3, where R' is hydrogen, an aliphatic or aromatic group with 1 to 18 carbon atoms and where an effective amount for curing of the R' groups are hydrogen groups; and a platinum curing catalyst.

8. A method of modulating the refractive index of the refractive index modulation element of claim 7, comprising modulating the temperature of the refractive index modulation element within a temperature range of −70° to 250° C.

9. The refractive index modulation device of claim 1, further comprising a light-propagating medium in contact with said refractive index modulation element.

10. The refractive index modulation device of claim 9, further comprising a heat application means in contact with said refractive index modulation element.

11. A method of manufacturing the refractive index modulation device of claim 1, comprising the steps of:

applying the polysiloxane material on a light-propagating medium, hardening the applied polysiloxane material to form a refractive index modulating element, and then placing a heat application means onto the refractive index modulating element.

12. A method of modulating the refractive index of the refractive index modulation element of claim 1, comprising modulating the temperature of the refractive index modulation element within a temperature range of −70° to 250° C.

13. A method of modulating the refractive index of the refractive index modulation element of claim 2, comprising modulating the temperature of the refractive index modulation element within a temperature range of −70° to 250° C.

* * * * *